(12) United States Patent
Huang et al.

(10) Patent No.: US 11,204,542 B2
(45) Date of Patent: Dec. 21, 2021

(54) LIGHT-EMITTING DEVICE AND PROJECTOR USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Shi-Kai Huang, New Taipei (TW); Tsung-Je Chiu, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/887,456

(22) Filed: May 29, 2020

(65) Prior Publication Data
US 2021/0325770 A1    Oct. 21, 2021

(30) Foreign Application Priority Data
Apr. 21, 2020 (CN) .......................... 202010319209.X

(51) Int. Cl.
G02B 27/09 (2006.01)
G03B 21/20 (2006.01)

(52) U.S. Cl.
CPC ....... *G03B 21/208* (2013.01); *G03B 21/2066* (2013.01)

(58) Field of Classification Search
CPC .......................... G03B 21/208; G03B 21/2066
See application file for complete search history.

(56) References Cited

U.S. PATENT DOCUMENTS

| | | | | |
|---|---|---|---|---|
| 6,044,096 A * | 3/2000 | Wolak | ..................... | G02B 27/09 372/109 |
| 6,577,429 B1 * | 6/2003 | Kurtz | ..................... | G02B 27/48 347/239 |
| 6,700,709 B1 * | 3/2004 | Fermann | ................. | G02B 27/09 359/641 |
| 7,159,986 B2 * | 1/2007 | Bremer | ................... | G03B 21/26 348/801 |
| 7,241,027 B2 * | 7/2007 | Cho | ...................... | H04N 9/3117 348/E9.027 |
| 2003/0128543 A1 * | 7/2003 | Rekow | ............... | G02B 19/0014 362/259 |
| 2010/0110660 A1 * | 5/2010 | Brukilacchio | .......... | F21V 29/85 362/84 |

* cited by examiner

*Primary Examiner* — Arman B Fallahkhair
(74) *Attorney, Agent, or Firm* — ScienBiziP, P.C.

(57) ABSTRACT

A device as a light-emitting for a projector. The projector includes a light-emitting module and a first lens array positioned at one side. The first lens array includes a number of first lenses arranged in parallel along a first direction. The first lens array is configured to receive source light. A second lens array is positioned at a side of the first lens array. The second lens array includes a number of second lenses arranged in parallel along a second direction. The second lens array receives first collimated light from the first lenses and emits second collimated light which is of even light-spot density and uniform brightness.

2 Claims, 6 Drawing Sheets

LIGHT-EMITTING DEVICE AND PROJECTOR USING THE SAME

FIELD

The subject matter herein generally relates to projector and display technology, and particularly to a light-emitting device and a projector using the light-emitting device.

BACKGROUND

Widths of light beams emitted by a typical light-emitting device of a projector along the horizontal direction and vertical direction are generally not the same. Light spots corresponding to the light beam along any given direction may be flatter than in another direction. Thus, a light distribution along a given direction is uneven, and a utilization rate of the light beam is not high.

Therefore, there is room for improvement within the art.

BRIEF DESCRIPTION OF THE DRAWINGS

Implementations of the present disclosure will now be described, by way of embodiment, with reference to the attached figures.

DETAILED DESCRIPTION

Figure 1:
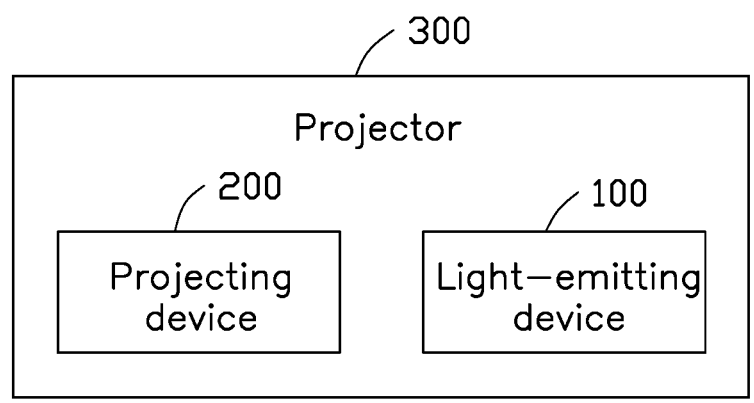
FIG. 1 is a block diagram of a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series, and the like.

The present disclosure is described in relation to a light-emitting device and a projector using the same.

FIG. 1 illustrates an embodiment of a projector 300. The projector 300 can be a light projector. The projector 300 includes a light-emitting device 100 and a projecting device 200. The light-emitting device 100 provides light to the projecting device 200. Thus, the projecting device 200 can project and display images and information.

Figure 2:
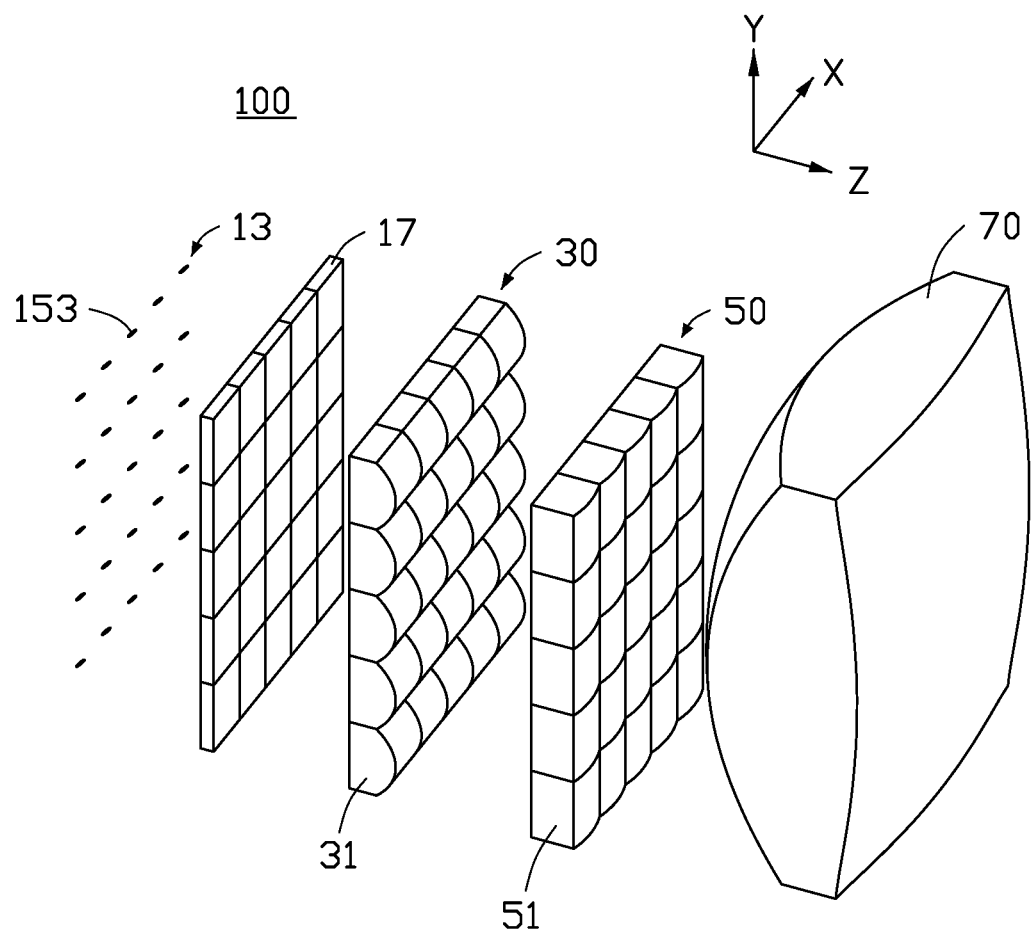
FIG. 2 is a disassembled view of a light-emitting device in the projector of FIG. 1.
Figure 3:
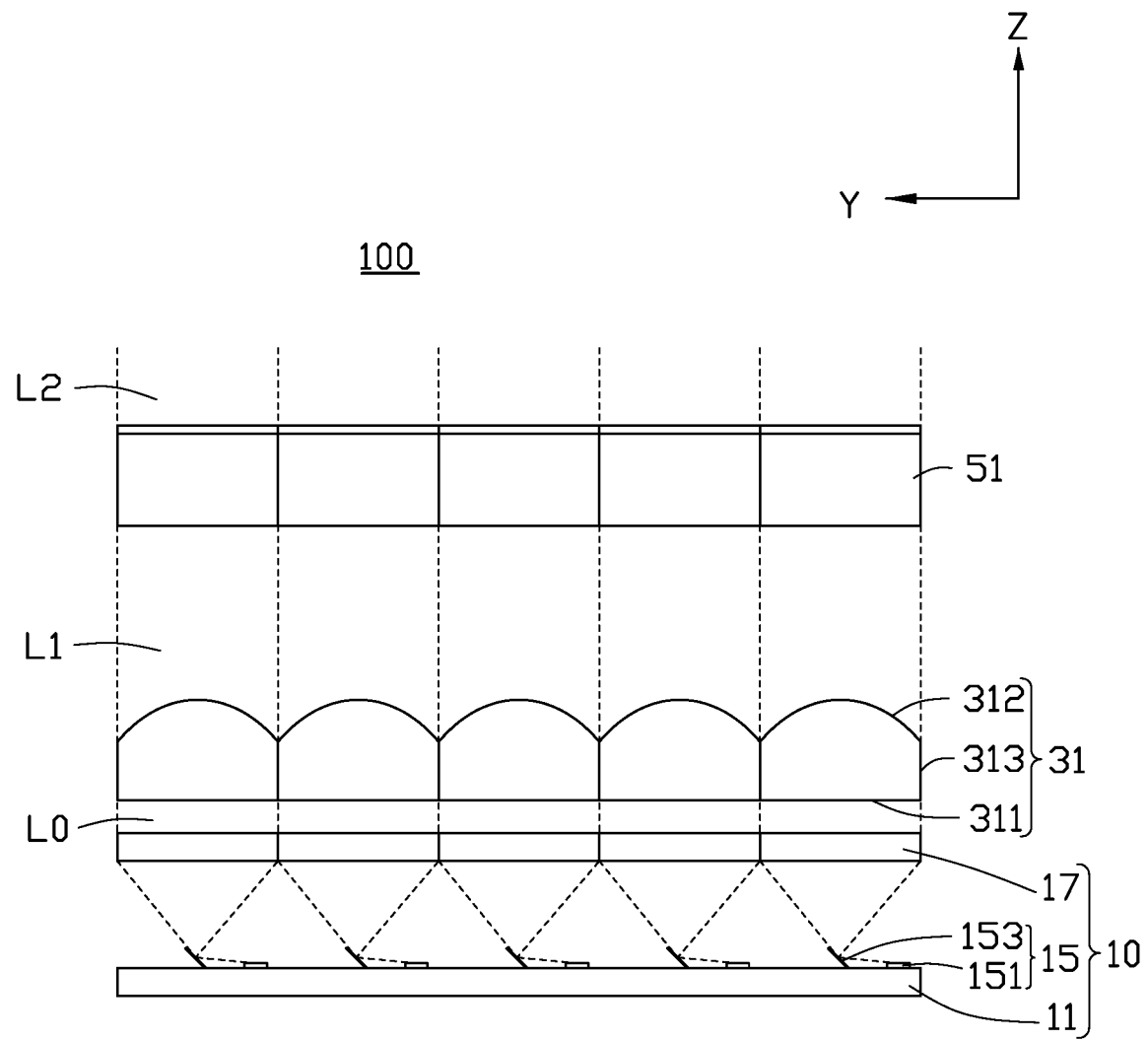
FIG. 3 is a cross-section view of the light-emitting device of FIG. 2.

Referring to FIGS. 2 and 3, the light-emitting device 100 includes a light-emitting module 10, a first lens array 30 positioned at a side of the light-emitting module 10, and a second lens array 50 positioned at a side of the first lens array 30.

The light-emitting module 10 emits source light L0. The first lens array 30 includes a plurality of first lenses 31 arranged in parallel along a first direction. The first lens array 30 is configured to receive and collimate the source light L0 and emit first collimated light L1. The second lens array 50 includes a plurality of second lenses 51 arranged in parallel along a second direction. The second lens array 50 is used to receive and collimate the first collimated light L1 and emit second collimated light L2.

The light-emitting module 10 includes a substrate 11 and a light-emitting array 13 positioned on the substrate 11. The light-emitting array 13 includes a plurality of light-emitting assemblies 15 arranged in a matrix of M rows and N columns, where M and N are integer numbers. In this embodiment, M=N=5 is taken as an example for description.

Each of the light-emitting assemblies 15 includes a light-emitting element 151 and a reflecting lens 153 corresponding to the light-emitting element 151. The light-emitting element 151 is configured to emit the source light L0. In this embodiment, each of the light-emitting elements 151 is a laser diode. In other embodiment, the light-emitting element 151 can also be a light-emitting diode, an organic light-emitting diode, and so on. In this embodiment, the light emitting element 151 emits a portion of the source light L0 from one side. The reflecting lens 153 is positioned at a side of the light emitting element 151. The reflecting lens 153 is configured to change a direction of the source light L0 and reflect the source light L0 to the first lens array 30.

In other embodiment, the light-emitting elements 151 may be configured to emit light along a forward direction, that is, to emit the source light L0 directly to the first lens array 30. Thus, the reflecting lenses 153 may be omitted.

The light-emitting module 10 further includes a light-transmitting lens 17 positioned at a side of the light-emitting array 13 for transmitting the source light L0 reflected by the reflecting lens 153 to the first lens array 30. Referring to FIG. 2, in this embodiment, the light-transmitting lens 17 includes a plurality of sub-lenses connected together, and each of the sub-lenses corresponds to one of the light-emitting assemblies 15.

Figure 4:
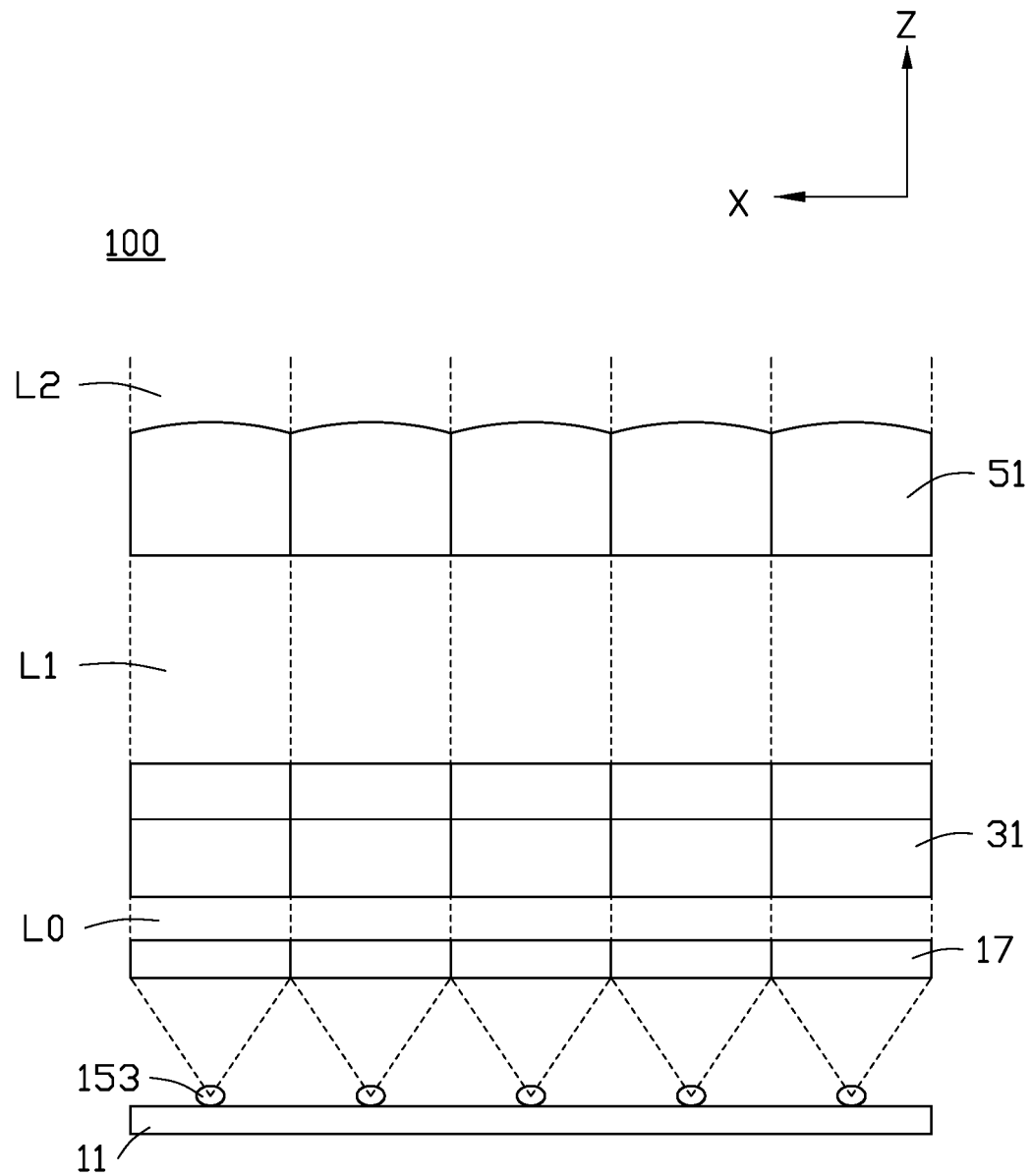
FIG. 4 is similar to FIG. 3, but viewed from another aspect.

Referring to FIG. 4, in this embodiment, the first lens array 30 includes the plurality of first lenses 31 arranged in the matrix of M×N. The second lens array 50 includes the plurality of second lenses 51 arranged in the matrix of M×N. One of the first lenses 31 and one of the second lenses 51 correspond to one of the light-emitting assemblies 15.

In this embodiment, the first lens 31 and the second lens 51 are both cylindrical lenses. Each of the cylindrical lenses includes a flat surface 311, a convex surface 312 opposite to the flat surface 311, and a side surface 313 connecting between the flat surface 311 and the convex surface 312. The convex surface 312 is substantially a semi-circular arc-shaped surface. The flat surfaces 311 of each of the cylindrical lenses are connected together and positioned on the same plane, and the side surfaces 313 of adjacent cylindrical lenses are closely attached to each other. The convex surfaces 312 form a continuous wave shape.

In this embodiment, a second curvature of the convex surface 312 of the second lens 51 is smaller than a first curvature of the convex surface 312 of the first lens 31. In other embodiment, the first curvature and the second curvature can be the same as each other.

In this embodiment, the first direction is substantially perpendicular to the second direction. The first direction is a horizontal direction and defined as an X-axis, and the second direction is a vertical direction and defined as a Y-axis. In addition, a direction perpendicular to the X-axis and the Y-axis is defined as a Z-axis. An axial direction of each of the first lenses 31 is the same as the first direction, that is, each of the first lenses 31 is arranged along the horizontal direction. An axial direction of each of the second lenses 51 is the same as the second direction, that is, each of the second lenses 51 is arranged along the vertical direction.

Figure 5:
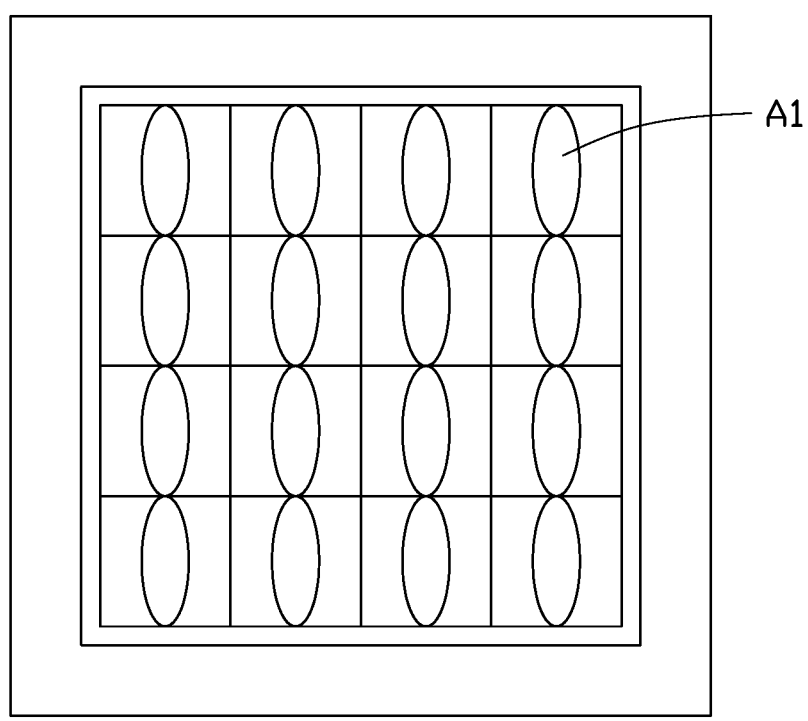
FIG. 5 is a schematic view of light spots of light beams of first collimated light in the projector of FIG. 1.

Referring to FIG. 5, the widths of light beams of the first collimated light L1 along the first direction are narrower than the widths of light beams of the first collimated light L1 along the second direction. Thus, light spots A1 of the light beams of the first collimated light L1 are substantially elliptical. The elliptical light spots are arranged in an array. The longer edges of the elliptical light spots in each column are connected, the shorter edges of the elliptical light spots in each row are arranged to be apart from each other.

Figure 6:
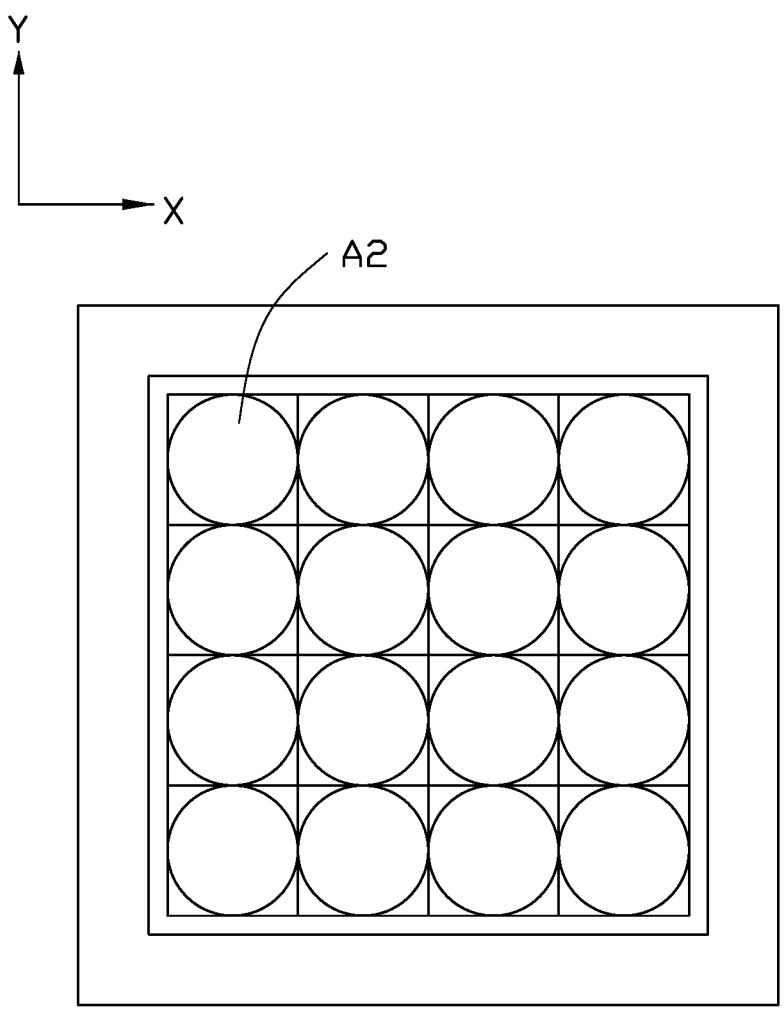
FIG. 6 is a schematic view of light spots of light beams of second collimated light in the projector of FIG. 1.

Referring to FIG. 6, the widths of light beams of the second collimated light L2 along the first direction are equal to the widths of light beams of the second collimated light L2 along the second direction. Thus, light spots A2 of the light beams of the second collimated light L2 are substantially circular. The circular light spots A2 are arranged in an array, and each of the circular light spots A2 is circumscribed with one or more adjacent circular light spot A2.

Referring to FIG. 2, in this embodiment, the light-emitting device 100 further includes a third lens 70 positioned at a side of the second lens array 50. The third lens 70 is an aspherical focusing lens configured to converge the second collimated light L2. Thus, most of the second collimated light L2 enter the projecting device 200, for example, into a light guide tube (not shown) of the projecting device 200.

In other embodiment, the light-emitting device 100 can be applied to any equipment providing illumination.

The light-emitting device 100 and the projector 300 having the light-emitting device 100 can emit the second collimated light L2 after collimating the source light L0 by the first lens array 30 and the second lens array 50. The light spots A2 of the light beams of the second collimated light L2 are substantially circular. An area of each of the circular light spots A2 is larger. A distribution of the light is more uniform, and a light utilization rate is also higher. Thus, brightness of a screen projected by the projector 300 is also more even.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A light-emitting device comprising:
   a light-emitting module configured to emit source light;
   a first lens array positioned at a side of the light-emitting module, wherein the first lens array comprises a plurality of first lenses arranged in parallel along a first direction, the first leas array is configured to receive the source light, collimate the source light, and emit first collimated light; and
   a second lens array positioned at a side of the first lens array, wherein the second lens array comprises a plurality of second lenses arranged in parallel along a second direction, the second lens array is configured to receive the first collimated light, collimate the first collimated light, and emit second collimated light;
   wherein the light-emitting module comprises:
   a substrate; and
   a light-emitting array positioned on the substrate, the light-emitting array comprises a plurality of light-emitting assemblies arranged in a matrix of M rows and N columns, wherein M and N are integer numbers;
   wherein the plurality of first lenses are arranged in the matrix of M×N, the plurality of second lenses are arranged in the matrix of M×N, the plurality of first lenses and the plurality of second lenses are both cylindrical lenses, each of the plurality of first lenses and each of the plurality of second lenses correspond to one of the plurality of light-emitting assemblies;
   wherein each of the plurality of light-emitting assemblies comprises:
   a light-emitting element configured to emit the source light; and
   a reflecting lens corresponding to the light-emitting, element, and positioned at a side of the corresponding light emitting element, the reflecting lens is configured to reflect the source light to the first lens array,
   wherein the light-emitting module further comprises a light-transmitting lens positioned at a side of the light-emitting array for transmitting the source light reflected by the reflecting lens to the first lens array.

2. A projector comprising:
   a light-emitting device comprising:
      a light-emitting module configured to emit source light;
      a first lens array positioned at a side of the light-emitting module, wherein the first lens array comprises a plurality of first lenses arranged in parallel along a first direction, the first lens array is configured to receive the source light, collimate the source light, and emit first collimated light; and
   a second lens array positioned at a side of the first lens array, wherein the second lens array comprises a plurality of second lenses arranged in parallel along a second direction, the second lens array is configured to receive the first collimated light, collimate the first collimated light, and emit second collimated light;
   wherein the light-emitting module comprises:
      a substrate; and
      a light-emitting array positioned on the substrate, the light-emitting array comprises a plurality of light-emitting assemblies arranged in a matrix of M rows and N columns, wherein M and N are integer numbers;

wherein the plurality of first lenses are arranged in the matrix of M×N, the plurality of second lenses are arranged in the matrix of M×N, the plurality of first lenses and the plurality of second lenses are both cylindrical lenses, each of the plurality of first lenses and each of the plurality of second lenses correspond to one of the plurality of light-emitting assemblies;

wherein each of the plurality of light-emitting assemblies comprises:

a light-emitting element configured to emit the source light; and a reflecting lens corresponding to the light emitting element, and positioned at a side if the corresponding light emitting element, the reflection lens is configured to reflect the source light to the first lens array, wherein the light-emitting module further comprises a light-transmitting lens positioned at a side of the light-emitting array for transmitting the source light reflected by the reflecting lens to the first lens array.

* * * * *